US008784529B2

(12) United States Patent
Black et al.

(10) Patent No.: US 8,784,529 B2
(45) Date of Patent: Jul. 22, 2014

(54) DEHUMIDIFIERS HAVING IMPROVED HEAT EXCHANGE BLOCKS AND ASSOCIATED METHODS OF USE AND MANUFACTURE

(71) Applicants: Richard A. Black, Bellingham, WA (US); Brett Bartholmey, Bellingham, WA (US); Aaron Matthew Kiesser, Mount Vernon, WA (US)

(72) Inventors: Richard A. Black, Bellingham, WA (US); Brett Bartholmey, Bellingham, WA (US); Aaron Matthew Kiesser, Mount Vernon, WA (US)

(73) Assignee: Dri-Eaz Products, Inc., Burlington, WA (US)

( * ) Notice: Subject to any disclaimer, the term of this patent is extended or adjusted under 35 U.S.C. 154(b) by 0 days.

(21) Appl. No.: 13/652,423

(22) Filed: Oct. 15, 2012

(65) Prior Publication Data

US 2013/0091817 A1    Apr. 18, 2013

Related U.S. Application Data

(60) Provisional application No. 61/547,613, filed on Oct. 14, 2011.

(51) Int. Cl.

| | |
|---|---|
| *B01D 24/00* | (2006.01) |
| *B01D 39/06* | (2006.01) |
| *B01D 39/14* | (2006.01) |
| *B01D 39/20* | (2006.01) |
| *F28D 5/00* | (2006.01) |
| *F24D 3/14* | (2006.01) |
| *F23L 15/02* | (2006.01) |
| *B01D 45/06* | (2006.01) |
| *B01D 53/26* | (2006.01) |
| *F24F 13/14* | (2006.01) |
| *F24F 3/14* | (2006.01) |
| *F24F 13/30* | (2006.01) |

(52) U.S. Cl.
CPC .............. *B01D 45/06* (2013.01); *B01D 53/265* (2013.01); *B01D 2259/4508* (2013.01); *F24F 13/14* (2013.01); *F24F 3/1405* (2013.01); *F24F 13/30* (2013.01)
USPC ................... 55/523; 55/522; 55/524; 62/311; 62/304; 165/60; 165/8

(58) Field of Classification Search
USPC .............. 55/522–524; 62/311, 304; 165/60, 8
See application file for complete search history.

(56) References Cited

U.S. PATENT DOCUMENTS

| | | |
|---|---|---|
| 1,690,108 A | 11/1928 | Grady |
| 1,870,457 A | 8/1932 | Kenney |

(Continued)

FOREIGN PATENT DOCUMENTS

| | | |
|---|---|---|
| CN | 1046384 A | 10/1990 |
| EP | 0046528 A1 | 3/1982 |

(Continued)

OTHER PUBLICATIONS

U.S. Appl. No. 29/435,041, filed Oct. 18, 2012, Wolfe.

(Continued)

*Primary Examiner* — Amber Orlando
(74) *Attorney, Agent, or Firm* — Perkins Coie LLP (57) ABSTRACT

Dehumidifiers having improved heat exchange blocks and associated methods of use and manufacture are disclosed. A heat exchange system in accordance with a particular embodiment can include a plurality of elements with a plurality of airflow channels. A plurality of peripheral spacers are positioned toward edges of neighboring elements and extend in a first direction. A first airflow path extends in the first direction, and is at least partially defined by the corresponding elements and the peripheral spacers. A second airflow path is defined by the airflow channels and extends in a second direction, and an airflow blocker is positioned at a corner portion of the elements to prevent fluid communication between the first and the second airflow paths at the elements. In certain embodiments, the heat exchange system can further include a dehumidifier having an evaporator positioned between the first and second airflow paths.

19 Claims, 7 Drawing Sheets

(56) References Cited

U.S. PATENT DOCUMENTS

| | | |
|---|---|---|
| 1,894,026 A | 1/1933 | Derry |
| 2,093,725 A | 9/1937 | Hull |
| 2,130,092 A | 9/1938 | Kettering |
| 2,188,975 A | 2/1940 | Herz |
| 2,623,364 A | 12/1952 | Munters |
| D171,429 S | 2/1954 | Thompson |
| 2,719,596 A | 10/1955 | Kent et al. |
| 2,758,390 A | 8/1956 | Munters |
| 2,886,956 A | 5/1959 | Loveley |
| 2,905,851 A | 9/1959 | Caussin |
| 2,932,178 A | 4/1960 | Armstrong et al. |
| 2,959,036 A | 11/1960 | Mehalick |
| 2,959,400 A * | 11/1960 | Simpelaar ............... 165/166 |
| 2,975,609 A | 3/1961 | Allander et al. |
| 3,000,193 A | 9/1961 | Crider |
| 3,035,419 A | 5/1962 | Wigert |
| 3,097,507 A | 7/1963 | Makuh |
| 3,141,762 A | 7/1964 | Serck-Hanssen |
| 3,149,479 A | 9/1964 | Peterson |
| 3,265,129 A * | 8/1966 | Bawabe ............... 165/166 |
| D212,777 S | 11/1968 | Anderson |
| 3,621,906 A | 11/1971 | Leffert |
| 3,623,549 A | 11/1971 | Smith, Jr. |
| 3,807,493 A | 4/1974 | Stewart |
| 3,820,581 A | 6/1974 | Machida et al. |
| 3,866,674 A * | 2/1975 | Tramuta et al. ............... 165/166 |
| 3,877,518 A | 4/1975 | Dreksler |
| 3,968,833 A | 7/1976 | Strindehag et al. |
| 4,000,779 A | 1/1977 | Irwin |
| 4,044,820 A | 8/1977 | Nobles |
| 4,091,547 A | 5/1978 | Leigh |
| 4,099,928 A * | 7/1978 | Norback ............... 29/890.039 |
| 4,176,525 A | 12/1979 | Tucker et al. |
| 4,183,399 A | 1/1980 | Seehausen |
| 4,189,848 A | 2/1980 | Ko et al. |
| D254,566 S | 3/1980 | Cummins |
| 4,259,268 A | 3/1981 | DiRoss |
| 4,280,483 A | 7/1981 | Schaffer |
| 4,295,342 A | 10/1981 | Parro |
| 4,333,517 A | 6/1982 | Parro |
| 4,428,207 A | 1/1984 | Hall |
| 4,452,051 A | 6/1984 | Berger et al. |
| 4,502,286 A | 3/1985 | Okada et al. |
| 4,546,820 A | 10/1985 | Whipple |
| 4,607,498 A | 8/1986 | Dinh |
| 4,615,383 A | 10/1986 | Hisao |
| 4,628,696 A | 12/1986 | Rodgers |
| 4,724,901 A | 2/1988 | Munekawa |
| 4,758,385 A * | 7/1988 | Acker et al. ............... 261/153 |
| 4,761,966 A * | 8/1988 | Stark ............... 62/176.6 |
| 4,771,824 A | 9/1988 | Rojey et al. |
| 4,827,733 A | 5/1989 | Dinh |
| 4,921,041 A | 5/1990 | Akachi |
| D308,414 S | 6/1990 | Makihara |
| 4,938,035 A | 7/1990 | Dinh |
| 4,942,740 A | 7/1990 | Shaw et al. |
| D310,412 S | 9/1990 | Fukumoto et al. |
| 4,971,137 A * | 11/1990 | Thompson ............... 165/276 |
| 4,971,139 A | 11/1990 | Khattar |
| 5,031,411 A | 7/1991 | Gehring et al. |
| 5,033,539 A | 7/1991 | Kohtaka |
| 5,050,109 A | 9/1991 | Ladd |
| D325,252 S | 4/1992 | Morris et al. |
| 5,115,645 A | 5/1992 | Abraham |
| 5,117,651 A | 6/1992 | Suh |
| 5,183,106 A * | 2/1993 | Stancliffe et al. ............... 165/166 |
| D333,890 S | 3/1993 | Oberdorfer-Bogel |
| D334,258 S | 3/1993 | Oberdorfer-Bogel |
| 5,219,020 A | 6/1993 | Akachi |
| D337,592 S | 7/1993 | Hider et al. |
| 5,265,895 A | 11/1993 | Barrett |
| 5,269,151 A | 12/1993 | Dinh |
| D343,706 S | 1/1994 | Gurstein |
| 5,301,515 A | 4/1994 | Iritani et al. |
| 5,303,561 A | 4/1994 | Bahel et al. |
| 5,333,470 A | 8/1994 | Dinh |
| 5,394,040 A | 2/1995 | Khanh |
| 5,404,938 A | 4/1995 | Dinh |
| D361,178 S | 8/1995 | Piret |
| 5,443,624 A | 8/1995 | Claesson |
| 5,448,897 A | 9/1995 | Dinh |
| D364,947 S | 12/1995 | Kent et al. |
| D368,770 S | 4/1996 | Tanner et al. |
| 5,548,905 A | 8/1996 | Kuma et al. |
| 5,564,184 A | 10/1996 | Dinh |
| 5,582,246 A | 12/1996 | Dinh |
| D379,016 S | 4/1997 | Wilson |
| 5,634,353 A | 6/1997 | Hallin et al. |
| 5,649,372 A | 7/1997 | Souza |
| 5,684,672 A | 11/1997 | Karidis et al. |
| 5,736,647 A | 4/1998 | Matsubara et al. |
| D394,499 S | 5/1998 | Bettag et al. |
| 5,746,061 A | 5/1998 | Kramer |
| 5,749,415 A | 5/1998 | Dinh |
| D395,492 S | 6/1998 | Phillips et al. |
| 5,785,723 A | 7/1998 | Beran et al. |
| 5,794,453 A | 8/1998 | Barnwell |
| D402,021 S | 12/1998 | Allen et al. |
| 5,845,702 A | 12/1998 | Dinh |
| 5,890,368 A | 4/1999 | Lakdawala |
| 5,901,565 A | 5/1999 | Morton, Jr. |
| 5,913,360 A | 6/1999 | Stark |
| 5,921,315 A | 7/1999 | Dinh |
| 5,950,439 A | 9/1999 | Peterson et al. |
| 5,953,831 A | 9/1999 | Yu |
| 5,953,926 A | 9/1999 | Dressler et al. |
| 5,992,161 A | 11/1999 | O'Halloran et al. |
| D419,230 S | 1/2000 | Ciccone |
| D420,473 S | 2/2000 | Shero |
| 6,021,644 A | 2/2000 | Ares et al. |
| 6,029,464 A | 2/2000 | Kil et al. |
| 6,030,426 A | 2/2000 | Stopyra et al. |
| 6,035,551 A | 3/2000 | Scheufler et al. |
| D422,351 S | 4/2000 | Griffin |
| D422,386 S | 4/2000 | Jaros et al. |
| D426,473 S | 6/2000 | Blackburn |
| 6,101,815 A | 8/2000 | van Oort et al. |
| 6,105,278 A | 8/2000 | Gerrish et al. |
| 6,182,747 B1 * | 2/2001 | Stark ............... 165/166 |
| D441,161 S | 4/2001 | Shetterly |
| 6,223,543 B1 | 5/2001 | Sandelman |
| 6,237,352 B1 | 5/2001 | Goodchild |
| D445,116 S | 7/2001 | Evans et al. |
| D446,612 S | 8/2001 | Kohler |
| D453,560 S | 2/2002 | Van Brunt |
| 6,447,586 B1 | 9/2002 | Campbell |
| D465,018 S | 10/2002 | Gustafsson et al. |
| 6,463,794 B1 | 10/2002 | Moshe et al. |
| 6,478,855 B1 | 11/2002 | Okano |
| 6,542,062 B1 | 4/2003 | Herrick |
| D480,467 S | 10/2003 | White |
| D482,171 S | 11/2003 | Vui et al. |
| 6,644,060 B1 | 11/2003 | Dagan |
| 6,796,896 B2 | 9/2004 | Laiti |
| D500,848 S | 1/2005 | Holderfield et al. |
| 6,895,774 B1 | 5/2005 | Ares et al. |
| D508,735 S | 8/2005 | Klein |
| 6,941,763 B2 | 9/2005 | Maeda et al. |
| D515,190 S | 2/2006 | Bartholmey et al. |
| D529,019 S | 9/2006 | Lim |
| 7,194,870 B1 | 3/2007 | O'Brien et al. |
| 7,228,693 B2 | 6/2007 | Helt |
| 7,246,503 B1 | 7/2007 | O'Brien et al. |
| 7,281,389 B1 | 10/2007 | O'Brien et al. |
| D565,269 S | 3/2008 | Tomasiak et al. |
| D572,356 S | 7/2008 | Harber |
| D577,426 S | 9/2008 | Huang |
| D581,111 S | 11/2008 | DiPasquale |
| D581,608 S | 11/2008 | Dammkoehler et al. |
| 7,581,408 B2 * | 9/2009 | Stark ............... 62/93 |
| D612,032 S | 3/2010 | Gildersleeve et al. |
| D617,437 S | 6/2010 | Matsuzaki |
| 7,856,840 B2 | 12/2010 | Yoon et al. |
| D634,414 S | 3/2011 | Wolfe et al. |

(56) References Cited

U.S. PATENT DOCUMENTS

| | | | |
|---|---|---|---|
| D641,844 S | 7/2011 | Kim et al. | |
| D641,845 S | 7/2011 | Breit et al. | |
| 8,056,182 B2 | 11/2011 | Day | |
| 8,091,868 B2* | 1/2012 | Robb et al. | 261/101 |
| 8,127,397 B2 | 3/2012 | Hess et al. | |
| 8,227,648 B2* | 7/2012 | Wegerer et al. | 568/916 |
| D678,494 S | 3/2013 | Wolfe et al. | |
| 2001/0045098 A1 | 11/2001 | Derryberry et al. | |
| 2003/0034573 A1 | 2/2003 | Mulvaney | |
| 2005/0011255 A1 | 1/2005 | Weisenberger et al. | |
| 2005/0011962 A1 | 1/2005 | Weisenberger et al. | |
| 2005/0066538 A1 | 3/2005 | Goldberg et al. | |
| 2005/0183430 A1 | 8/2005 | McMillan et al. | |
| 2005/0218535 A1 | 10/2005 | Maisotsenko et al. | |
| 2005/0235673 A1* | 10/2005 | Sueoka et al. | 62/271 |
| 2006/0086125 A1* | 4/2006 | Sueoka et al. | 62/304 |
| 2006/0214315 A1 | 9/2006 | Williams | |
| 2006/0260790 A1* | 11/2006 | Theno et al. | 165/166 |
| 2007/0012060 A1 | 1/2007 | Simons | |
| 2007/0107450 A1 | 5/2007 | Sasao et al. | |
| 2008/0028776 A1 | 2/2008 | O'Brien et al. | |
| 2008/0202131 A1 | 8/2008 | Brody | |
| 2008/0223050 A1 | 9/2008 | Bruders et al. | |
| 2009/0007367 A1 | 1/2009 | Archbold | |
| 2009/0101727 A1 | 4/2009 | Boudreau | |
| 2009/0165485 A1* | 7/2009 | Stark | 62/272 |
| 2010/0125367 A1 | 5/2010 | Burton et al. | |
| 2010/0224565 A1* | 9/2010 | Dunne et al. | 210/670 |
| 2010/0269526 A1 | 10/2010 | Pendergrass et al. | |
| 2011/0061408 A1 | 3/2011 | Schnelle | |
| 2011/0073290 A1 | 3/2011 | Chang et al. | |
| 2013/0047662 A1 | 2/2013 | Black et al. | |

FOREIGN PATENT DOCUMENTS

| | | |
|---|---|---|
| EP | 830554 A1 | 3/1998 |
| EP | 893657 A1 | 1/1999 |
| FR | 2687464 A1 | 8/1993 |
| GB | 1311232 A | 3/1973 |
| GB | 2006950 A | 5/1979 |
| JP | 60188795 A | 9/1985 |
| JP | 61164622 A | 7/1986 |
| JP | 62023418 A | 1/1987 |
| JP | 01041792 A | 2/1989 |
| JP | 6111591 A | 4/1994 |
| JP | 07243666 A | 9/1995 |
| JP | 08135999 A | 5/1996 |
| JP | 09239230 A | 9/1997 |
| JP | 2007054700 A | 3/2007 |
| WO | WO-9112476 A1 | 8/1991 |
| WO | WO-9641111 A1 | 12/1996 |
| WO | WO-02-50623 A1 | 6/2002 |
| WO | WO-2008057647 A2 | 5/2008 |

OTHER PUBLICATIONS

"Air Conditioner/Dehumidifier," abstract from Spinoff 1986 article, facsimile dated Nov. 29, 1999, 2 pages.

"DrizAir 2400 Dehumidifier: Introduced in Aug. of 1998 . . . ", from web site, <http://www.dri-eaz.com/2400.htm>, Jan. 10, 2000, 2 pages.

Dri-Eaz, "2002 Product Catalog," Jan. 1, 2002, 7 pages.

Drieaz, "Complete Drying Solutions for Restorative Drying Professionals," 2000, 3 pages.

Dri-Eaz, "Driz-Air 2400 Captures Design Award," <http://www.dri-eaz.com/newsreleases/newsrelease999.html>, internet accessed on Jan. 10, 2000, 2 pages.

Dri-Eaz, Owner's Manuel—Evolution™ LGR Dehumidfier, 115v Model, Dri Eaz Products, Inc., www.dri-eaz.com, 2007, 7 pages.

Dri-Eaz, Product Catalog, Jan. 1, 2003, Burlington, Washington, U.S., 3 pages.

Hodnell, Charles, "Wrap-Around Heat Pipe Makes Its Debut!" Hot Line Newsletter, vol. 15, No. 1, Mar. 1995, 2 pages.

Johannesen, R., et al., "Efficient Humidity Control with Heat Pipes," University of Florida-Florida Cooperative Extension Service, Fact Sheet, Dec. 1991, 7 pages.

Jon-Don; Gale Force Air Mover from Dry-Air at Jon-Don; www.jondon.com/galeforce/; Mar. 2003, 3 pages.

New Release, "Dri-Eaz Products Introduces Rotomolded Dehumidifier", Aug. 27, 1998, from web site, <http://www.dri-eaz/newsreleases898.html>, 3 pages.

Tropic Kool, "What are Heat Pipes?" <http://tropickool.com/heat-pipes.html>, internet accessed on Nov. 29, 1999, 6 pages.

U.S. Products, "The Flood King—Portable Water Extractor for Restoration," Instant 212° F. Heat at the Wand Tip, http://www.usproducts.com/products/restoration/floodking.htm, accessed Aug. 17, 2011, 1 page.

International Search Report and Written Opinion for International Patent Application No. PCT/US12/060310, Applicant: Dri-Eaz Products, Inc., mailed Mar. 29, 2013, 9 pages.

Dri-Eaz, "DrizAir 120 Dehumidifier-Model Comparisons," undated, 4 pages.

Dri-Eaz, "DrizAir 2400 Dehumidifier," undated, 4 pages.

Heat Pipe Technology, Inc., "Dinh Dehumidifier Heat Pipes, Commercial and Industrial Applications," undated, 8 pages.

Phoenix Restoration Equipment, "Phoenix 200 HT—High Temperature Performance," www.us.phoenix.com undated, 2 pages.

* cited by examiner

DEHUMIDIFIERS HAVING IMPROVED HEAT EXCHANGE BLOCKS AND ASSOCIATED METHODS OF USE AND MANUFACTURE

CROSS-REFERENCE TO RELATED APPLICATION

The present application claims priority to U.S. Provisional Application No. 61/547,613, filed Oct. 14, 2011, which is incorporated herein by reference.

TECHNICAL FIELD

The following technology is directed generally to dehumidifiers and associated assemblies and methods, and more specifically, to dehumidifiers with heat exchange blocks having improved airflow features.

BACKGROUND

Dehumidifiers are used for removing moisture from air. A conventional dehumidifier typically directs an airflow across several components of a refrigeration cycle. The components of the refrigeration cycle cool the airflow below the dew-point temperature so that water vapor in the airflow is condensed to liquid and removed. Dehumidifiers are useful in many different applications. For example, dehumidifiers are frequently used in residential applications to reduce the level of humidity in the air for health reasons, as humid air can cause unwanted mold or mildew to grow inside homes. Moreover, many homeowners operate dehumidifiers to decrease the humidity of the air in their homes for comfort reasons, as extremely humid air can be uncomfortable. Dehumidifiers are also frequently used in commercial or industrial applications, for example to dry the air in water damage restoration projects. The drier air helps contractors restore buildings or other structures that have been flooded or suffered other types of water damage.

DETAILED DESCRIPTION

Several embodiments of the disclosed technology are described below with reference to a dehumidifier that is configured to remove moisture from an airflow passing through the dehumidifier along an overall airflow path. The airflow flows continuously along the overall airflow path, which can include several airflow segments, portions, or internal paths located at different positions. Specific details are identified in the following description with reference to FIGS. 1A-4 to provide a thorough understanding of various embodiments of the disclosed technology. Other details describing well-known structures or processes often associated with dehumidifiers, however, are not described below to avoid unnecessarily obscuring the description of the various embodiments of the disclosed technology. Moreover, although the following technology sets forth several embodiments of different aspects of the technology, other embodiments can have different configurations and/or different components than those described in this section. In addition, further embodiments of the technology may be practiced without several of the details described below, while still other embodiments of the technology may be practiced with additional details and/or features.

Figure 1A:
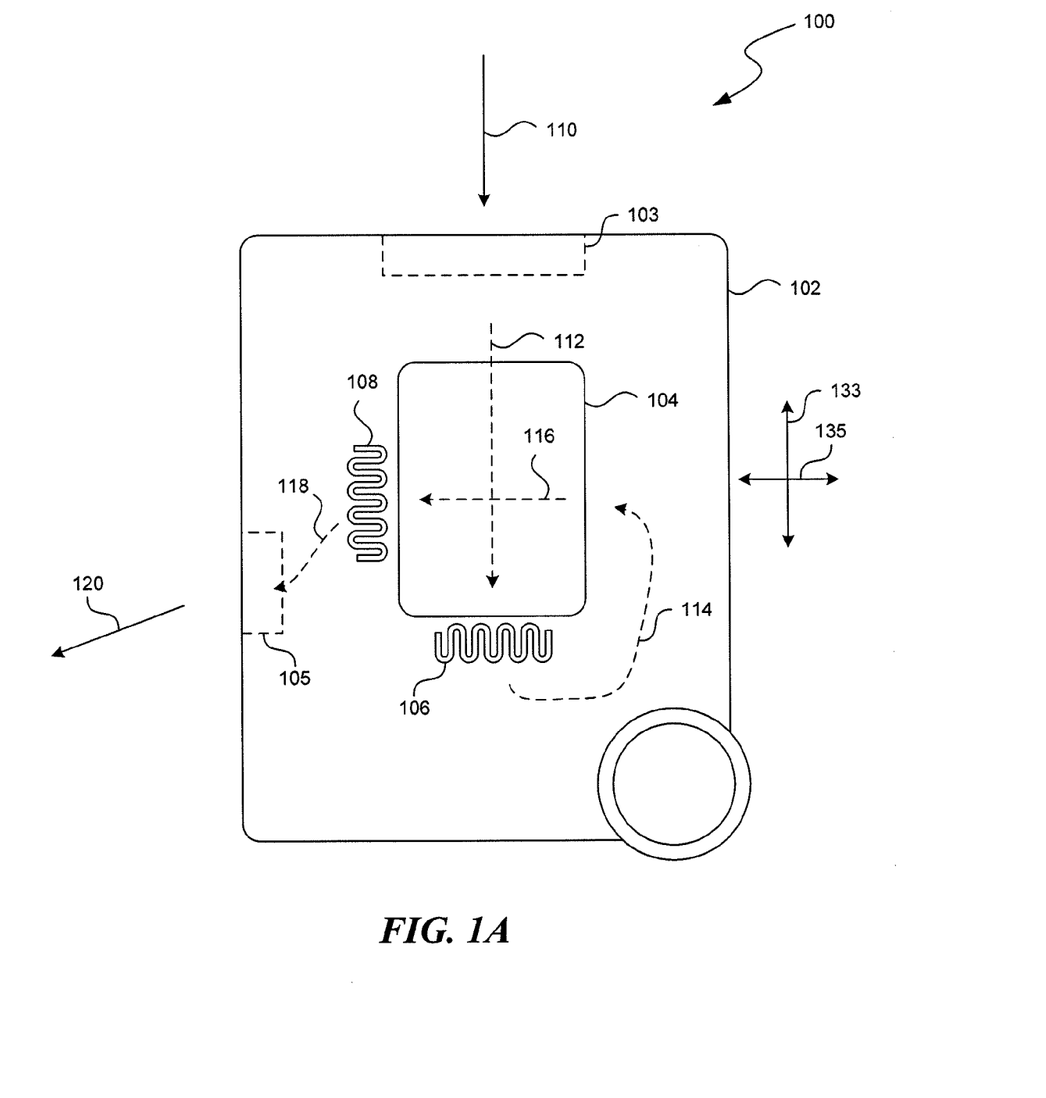
FIG. 1A is a schematic side view of a dehumidifier configured in accordance with embodiments of the disclosed technology.

The present technology is directed generally to dehumidifiers with improved airflow features and associated methods for manufacturing and operating dehumidifiers. FIG. 1A, for example, is a schematic side view of a dehumidifier 100 that is used to describe several features of embodiments of the technology. As shown in FIG. 1A, the dehumidifier 100 includes a cabinet or housing 102 with an inlet portion 103 and an outlet portion 105. The dehumidifier 100 can include a refrigeration cycle including multiple moisture removal devices. A representative embodiment of the dehumidifier 100 includes an evaporator 106 and a condenser 108 that are each positioned adjacent to a heat exchange block 104, which is an air-to-air heat exchanger. In other embodiments, however, the evaporator 106 and/or condenser 108 are not required to be adjacent to the heat exchange block 104. The heat exchange block 104 can be used to at least partially pre-cool airflow prior to the airflow reaching the evaporator 106. In certain conditions, such as in low relative humidity conditions (e.g., approximately 40% and below), pre-cooling the airflow prior to the evaporator 106 can greatly increase the efficiency of the dehumidifier 100. As described in detail below, as an air mover (e.g., an impeller, fan, etc.) draws airflow through the dehumidifier, the heat exchange block 104 is configured to sequentially direct airflow across or through the evaporator 106 and the condenser 108 to remove moisture from the airflow. As shown in FIG. 1A, for example, the airflow flows along an inlet airflow segment or path 110 and enters the inlet portion 103 of the dehumidifier 100. The heat exchange block 104 directs the airflow along a first airflow segment or path 112 in a first direction to flow across, through, adjacent to, or otherwise in thermal communication with the evaporator 106.

After passing the evaporator 106, the airflow is redirected along a redirected airflow segment 114 by internal components of the dehumidifier 100 to the heat exchange block 104. The heat exchange block then directs the airflow along a second airflow segment or path 116 in a second direction to flow across, through, adjacent to, or otherwise in thermal communication with the condenser 108. In certain embodiments, the second direction is generally perpendicular to the first direction. In other embodiments, however, the second direction can be at other suitable angles relative to the first direction. After exiting the condenser 108, the airflow travels through the housing 102 to the outlet portion 105 along a dehumidified airflow segment or path 118, and exits the housing 102 along an expelled airflow segment or path 120. Although the airflow segments or paths are schematically illustrated in FIG. 1A, one of ordinary skill in the relevant art will appreciate that airflow inside the dehumidifier 100 can include various different segments or paths, for example, curved, looped, straight, separated, and/or divergent segments or paths passing over, through, adjacent to, or otherwise in thermal communication with the various moisture removal components and/or refrigeration cycle components of the dehumidifier 100. As will also be appreciated by one of ordinary skill in the relevant art, the dehumidifier 100 illustrated in FIG. 1A can include any of a variety of suitable types of dehumidifiers, including, for example, a portable, commercial, industrial, residential, and/or personal dehumidifier.

As shown in FIG. 1A, the heat exchange block 104 can have a first dimension along a first or longitudinal axis 133 and a second dimension along a second or lateral axis 135 generally perpendicular to the first axis 133. In this embodiment, the first axis 133 is generally parallel to the first airflow segment 112, while the second axis 135 is generally parallel to the second airflow segment 116. In other embodiments, the first axis 133 can be generally nonparallel to the first airflow segment 112, and the second axis 135 can be generally nonparallel to the second airflow segment 116.

Figure 1B:
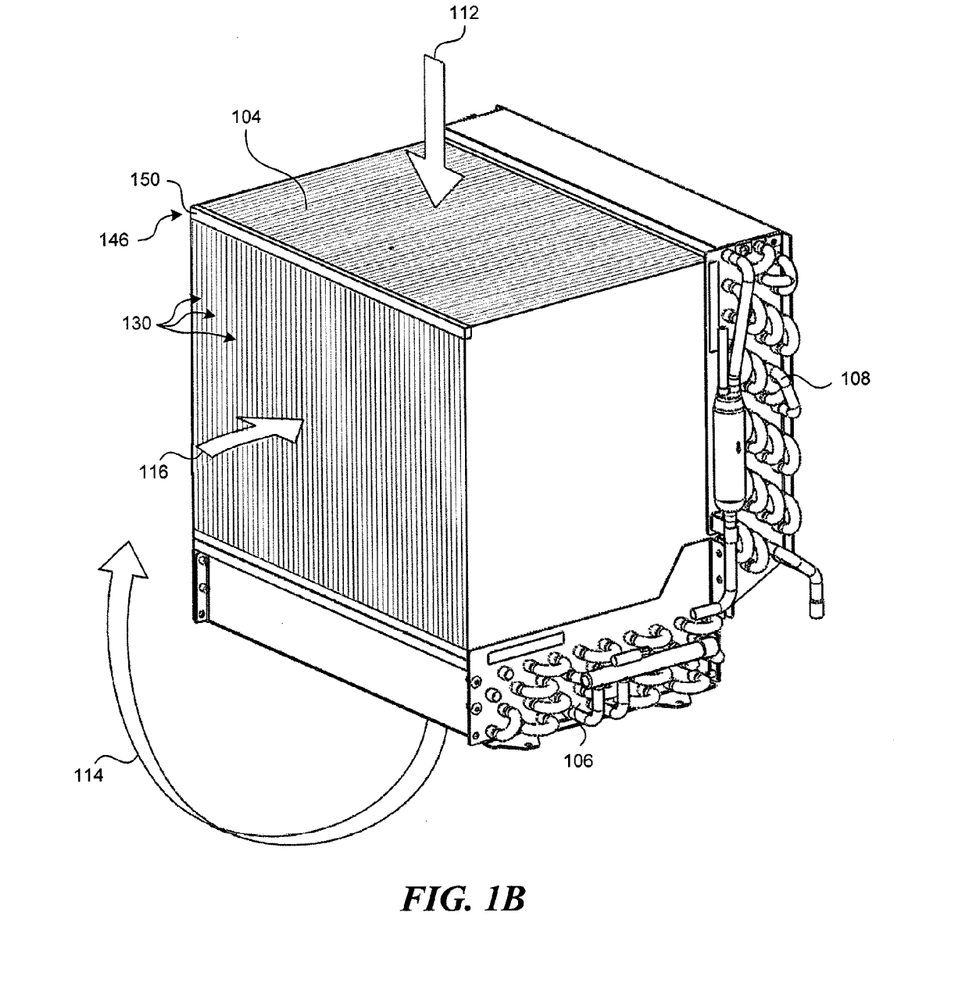
FIG. 1B is an isometric side view of a portion of a heat exchange block configured in accordance with embodiments of the disclosed technology.

FIG. 1B is an isometric side view of a heat exchange block 104 configured in accordance with certain embodiments of the technology. As shown in FIG. 1B, the heat exchange block 104 can be positioned adjacent to the evaporator 106 and the condenser 108. The airflow flows through the heat exchange block 104 (e.g., during the pre-cool process discussed above) along the first airflow segment 112 to the evaporator 106. Then the airflow is redirected from an exit of the evaporator 106 to flow back to the heat exchange block 104 along the redirected airflow segment 114. The airflow then flows through the heat exchange block 104 (e.g., during a pre-heat process, which includes heating the airflow in the second airflow segment 116 by the heat energy received from the first airflow segment 112) to the condenser 108 along the second airflow segment 116. The air in the first airflow segment 112 and the air in the second airflow segment 116 are in thermal communication within the heat exchange block 104 but do not mix.

As shown in FIG. 1B, the heat exchange block 104 can include a plurality of spaced-apart elements 130 shown in solid lines at the external surfaces of the heat exchange block 104 in FIG. 1B. Detailed illustrations of representative elements 130 are described further with reference to FIGS. 2A-4 below. In the embodiment shown in FIG. 1B, the heat exchange block 104 can include an airflow blocker 150 positioned at a corner portion 146 of the heat exchange block 104. In other embodiments, the airflow blocker 150 can be positioned at other corner portions (not labeled in FIG. 1B) of the heat exchange block 104. The airflow blocker 150 can direct the airflow within the heat exchange block 104 and prevent air leakage between airflows within the heat exchange block 104 (e.g., between the first and second airflow segments 112, 116). The airflow blocker 150 can be attached to the heat exchange block 104 by glue, adhesives, or other suitable arrangements.

Figure 2A:
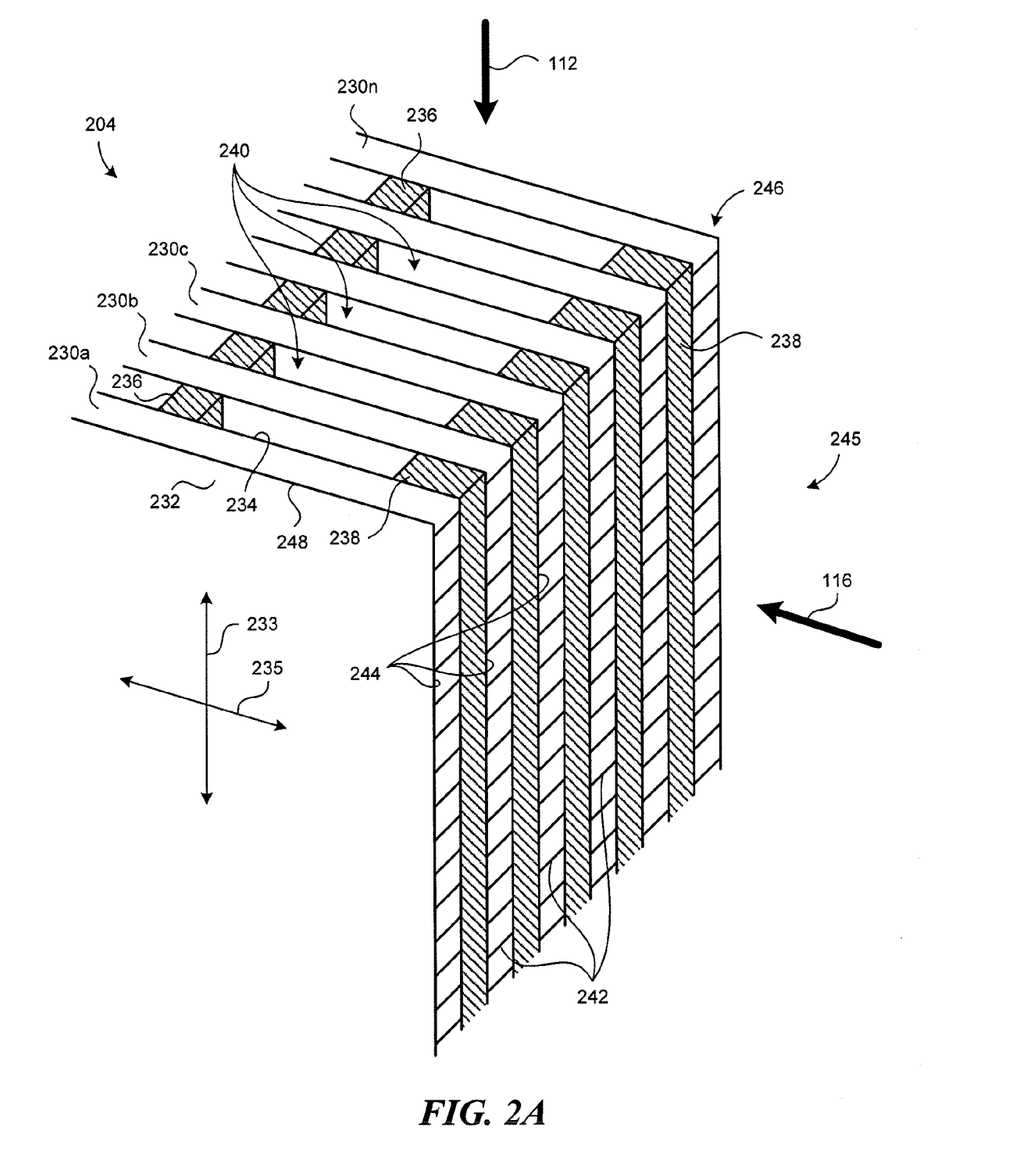
FIG. 2A is a partially schematic isometric side view of a portion of a heat exchange block configured in accordance with an embodiment of the disclosed technology.

FIG. 2A is a partially schematic isometric side view of a portion of a heat exchange block 204 configured in accordance with an embodiment of the disclosed technology. As shown in FIG. 2A, the heat exchange block 204 includes multiple spaced-apart elements 230 (identified individually as first through $n^{th}$ elements 230a-230n). Each element 230 includes a first face or side 232 opposite a second face or side 234. Each element 230 further includes a first dimension along a first or longitudinal axis 233 and a second dimension along a second or lateral axis 235 generally perpendicular to the first axis 233. Spacers are positioned between neighboring elements 230, e.g., in contact with the corresponding first and second sides 232, 234 of the neighboring elements 230. For example, in the illustrated embodiment, the heat exchange block 204 includes multiple interior spacers 236 as well as outer or peripheral spacers 238. In the illustrated embodiments, the individual spacers 236, 238 extend along the corresponding elements 230 in a direction generally parallel to the longitudinal axis 233 of the corresponding elements 230. As such, the heat exchange block 204 includes multiple first airflow paths channels 240 extending generally parallel to the direction of the longitudinal axis 233. The first airflow paths 240 are at least partially defined between the opposing first and second faces 232, 234 of neighboring elements 230, as well as the corresponding spacers 236, 238. The first airflow path 240 can be defined as the portion of the first airflow segment 112 within the heat exchange block 204.

According to additional features of the illustrated embodiment, each element 230 includes multiple segregated internal second airflow paths or channels 244 extending in a direction generally parallel to its lateral axis 235. More specifically, each element 230 includes multiple internal walls 242 extending transversely between its corresponding first side 232 and the second side 234. As such, each element 230 has a generally corrugated or fluted configuration defined by at least the internal walls 242 extending between the first side 232 and the second side 234. The second airflow paths 244 are exposed or open at a lateral side 245 of the heat exchange block 204 (e.g., as an entrance for the airflow along the second airflow segment 116). At the lateral side 245, however the space between neighboring elements 230 is blocked or otherwise at least partially sealed by the individual peripheral spacers 238. The second airflow paths 244 can be defined as the portion of the second airflow segment 116 within the heat exchange block 204.

Figure 2B:
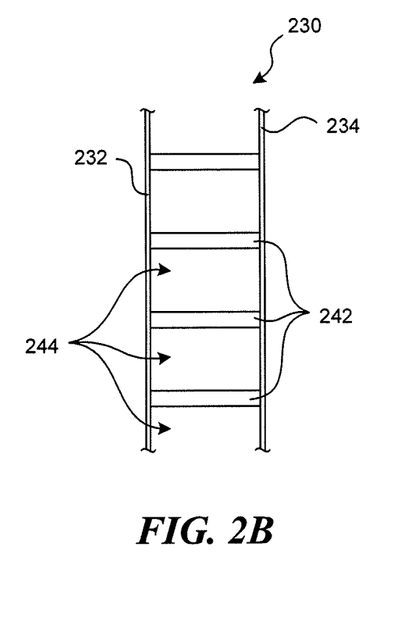
FIGS. 2B-2E are partially schematic side views of elements configured in accordance with embodiments of the disclosed technology.
Figure 2C:
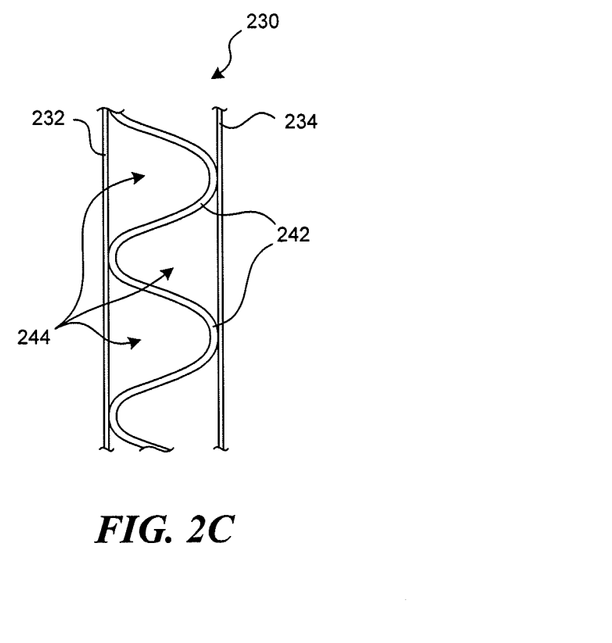
Figure 2D:
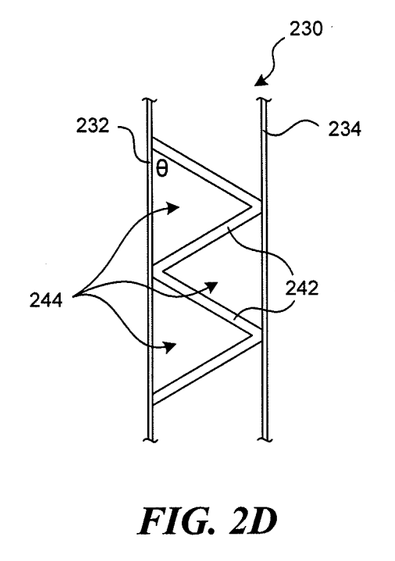

FIGS. 2B-2D are partially schematic side views of elements 230 configured in accordance with embodiments of the present technology. In FIG. 2B, the element 230 can include internal walls 242 that are generally parallel to one another and perpendicular to the element 230. In any of these embodiments, the internal walls 242 can be integrally formed with the element 230 (e.g., via an extrusion process), and in other embodiments, these internal walls 242 can be manufactured separately from the first and second sides 232, 234, and then attached to the first and second sides 232, 234. In the illustrated embodiment, the second airflow paths 244 can be defined by the internal walls 242 and the first and second sides 232, 234 of the element 230.

In an embodiment shown in FIG. 2C, the element 230 can include internal walls 242 having a generally corrugated configuration. The internal walls 242 can have a curved or wave shape. FIG. 2D illustrates another type of corrugated configuration, in which the internal walls 242 can be positioned to form an acute angle θ relative to the element 230. Individual internal walls 242 can have different acute angles θ relative to the element 230. For example, one internal wall 242 can form a 45° angle relative to the element 230, while another internal wall 242 can from a 30° angle relative to the element 230.

Figure 2E:
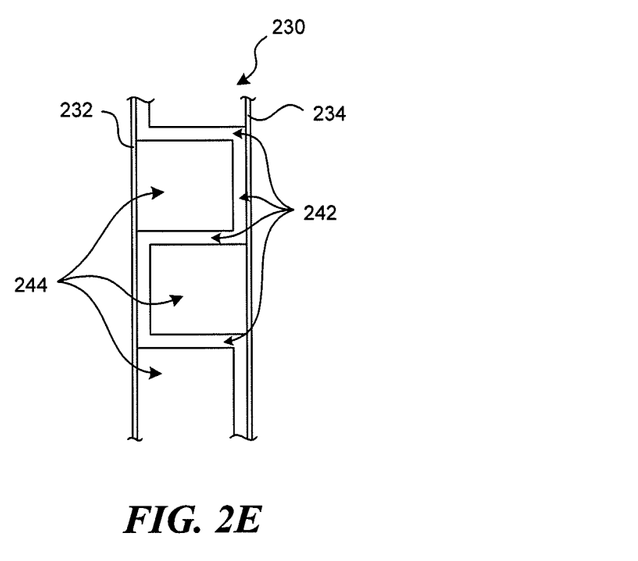

In an embodiment shown in FIG. 2E, the element 230 can include internal walls 242 having a generally fluted configuration. In the illustrated embodiment, the internal walls 242 can be formed as multiple flutes or grooves within the element 230. In any of the above embodiments, the shapes and configurations of the internal walls 242 can be selected to meet particular fluid flow and/or heat transfer performance targets.

Referring again to FIG. 2A, in certain embodiments, the individual elements 230 can be made from polypropylene that is approximately 3 mm thick and includes approximately 80 corrugated flutes or airflow channels 244 per foot. In other embodiments, the elements 230 can be made from other suitable materials including, for example, PVC, plastic, thermoplastic, thermoset, acrylic, etc. In addition, elements 230 configured in accordance with additional embodiments can be thicker or thinner than 3 mm, and/or can include a lesser or greater number of flutes or airflow channels 244 per foot. For example, in one embodiment, each element 230 can include approximately 50 flutes or airflow channels 244 per foot. The spacers 236, 238 can be made from the same material as the elements 230 in at least some embodiments. In other embodiments, the spacers 236, 238 can be made from a different material than the elements 230.

In operation, the airflow entering the heat exchange block 204 passes through the first airflow paths 240 between neighboring elements 230 generally in the direction of the longitudinal axis 233. In the illustrated embodiment, after exiting the heat exchange block 204 and passing through the evaporator 106 (FIG. 1A), the airflow entering the heat exchange block 204 passes through the second airflow paths 244 generally in the direction of the lateral axis 235. In the illustrated embodiment, the peripheral spacers 238 block or otherwise prevent the airflow along the second airflow segment 116 from passing between the opposing first and second faces 232, 234 of neighboring elements. As such, the airflow through the heat exchange block 204 along the second airflow segment 116 is separated from or otherwise does not fluidly communicate with the airflow along the first airflow segment 112 within the heat exchange block 204. As was shown in FIGS. 1A and 1B, the air in the second airflow segment 116 can include some or all of the air that previously passed along the first airflow segment 112.

In conventional systems, airflow can sometimes leak, escape, or otherwise deviate from the first and/or second airflow segments 112, 116 at the corner portions or edge portions 246 of the lateral sides 245 of the heat exchange block 204 (e.g., at corner edge portions 246 extending in a direction generally perpendicular to the first face 232 of individual elements). More specifically, dimensional variations introduced when cutting individual elements and/or assembling the stacked elements can result in imperfectly sealed corner or edge portions 246. For example, when cutting elements 230 to length in the longitudinal direction 233, the end portions of the elements 230 may have varying distances from the exposed internal wall 242 and a corresponding top edge portion 248. As explained in detail below, embodiments of the present technology are directed to sealing, blocking, occluding, or otherwise closing off the corner edge portions 246 of the heat exchange block 204.

Figure 3A:
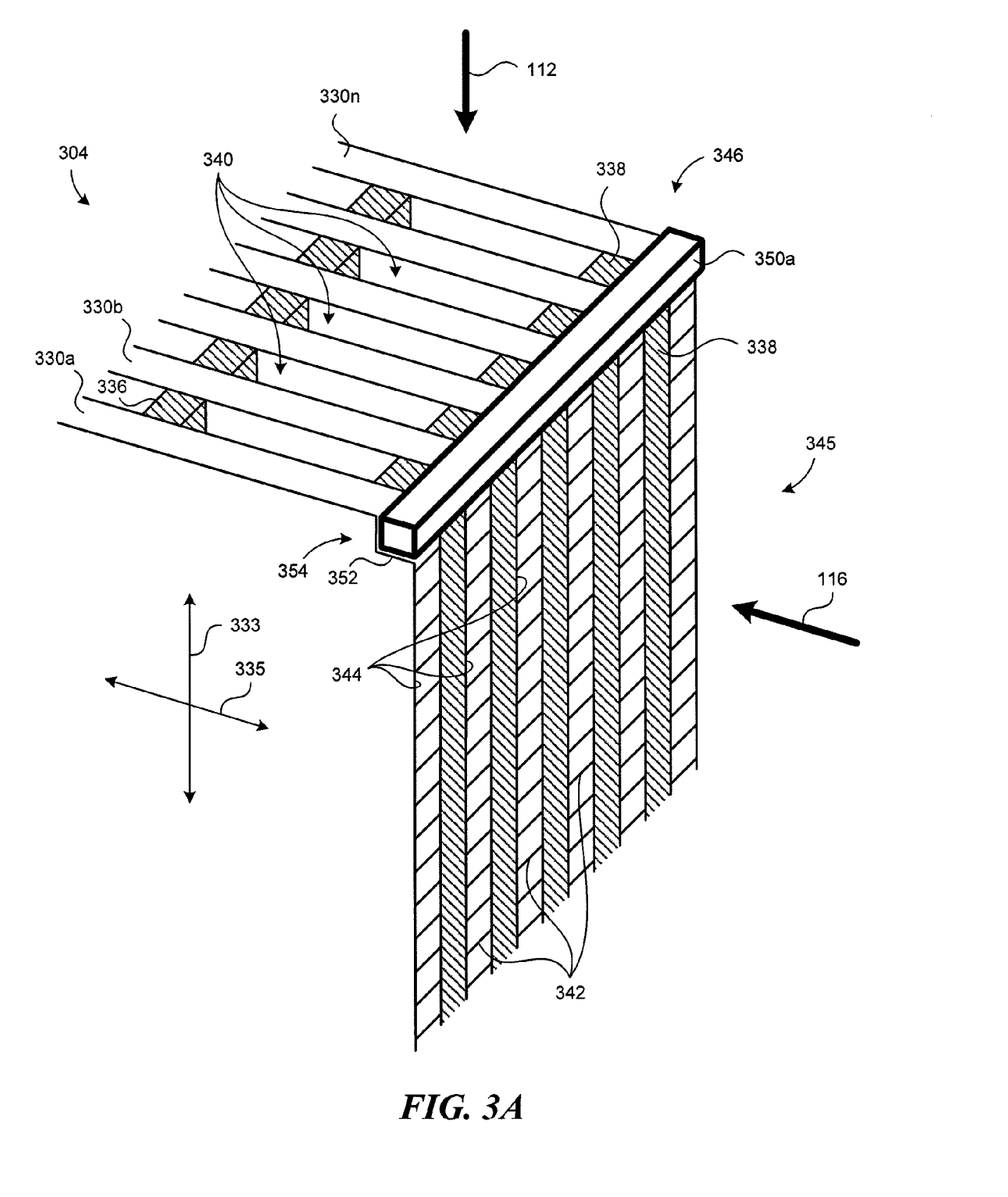
FIG. 3A is a partially schematic isometric side view of a portion of a heat exchange block configured in accordance with an embodiment of the disclosed technology.
Figure 3B:
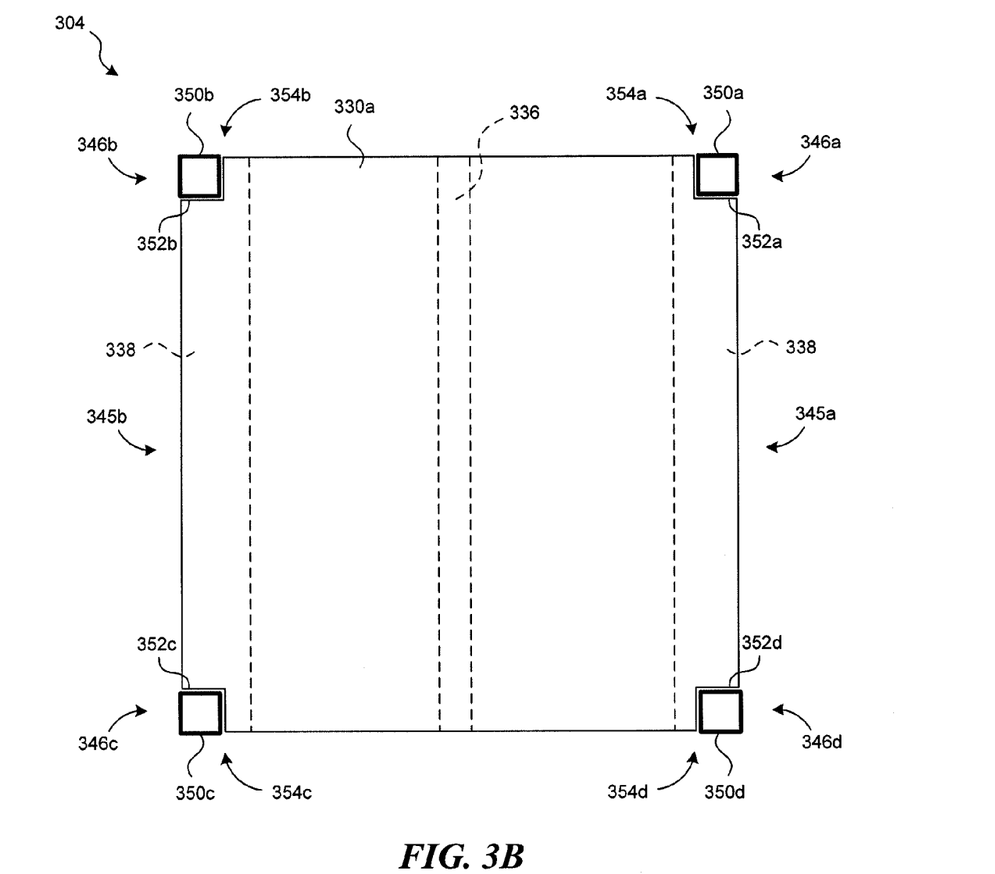
FIG. 3B is a side view of the heat exchange block of FIG. 3A.

FIG. 3A is a partially schematic isometric side view of a portion of a heat exchange block 304 configured in accordance with an embodiment of the technology. FIG. 3B is a partially schematic side view of the heat exchange block 304 of FIG. 3A. Referring to FIGS. 3A and 3B together, the illustrated heat exchange block 304 includes several features that are generally similar in structure and function to the heat exchange blocks 104, 204 described above with reference to FIGS. 1A, 1B and 2. For example, the heat exchange block 304 illustrated in FIGS. 3A and 3B includes multiple elements 330 that are spaced-apart by corresponding interior spacers 336 and peripheral spacers 338 (FIG. 3B illustrates first peripheral spacers 338a and second peripheral spacers 338b). The heat exchange block 304 further includes first airflow paths or channels 340 between neighboring elements 330 extending in a direction generally parallel to a longitudinal axis 333 of individual elements 330 to receive the airflow along the first airflow segment 112. The heat exchange block 304 also includes second airflow paths or channels 344 through individual elements 330 extending in a direction generally parallel to a lateral axis 335 of individual elements 330 to receive the airflow along the second airflow segment 116.

As shown in FIGS. 3A and 3B, the illustrated embodiment further includes one or more seals or airflow blockers 350 (identified as first through fourth seals 350a-350d in FIG. 3B) positioned at corresponding edge or corner portions 346 of the heat exchange block 304. The seals 350 are configured, shaped and positioned to confine or otherwise prevent the air in the first and second airflow segments 112, 116 (FIG. 3A) from leaking by spanning or extending across the corner edge portions 346 of the heat exchange block 304. More specifically, each element 330 can include a notched or cut-out portion 352 at each of its corresponding corners 354 (e.g., first through fourth corners 354a-354d shown in FIG. 3B) at its lateral side 345 (identified as a first lateral side 345a and a second lateral side 345b in FIG. 3B). In certain embodiments, each notched portion 352 can have a generally rectilinear shape as shown in FIGS. 3A and 3B. In other embodiments, however, the notched portions 354 can have other suitable configurations including, for example, generally curved shapes. In any of these embodiments, the notched portions 354 are generally small relative to the overall dimensions of the heat exchanger block 304 so as to avoid significantly impeding the flow through, and heat transfer within, the heat exchange block 304. The seal 350 is generally configured to seat in or otherwise conform to the shape of the individual notched portions 354 thereby allowing each seal 350 to extend across the corresponding corner edge portions 346 of the heat exchange block 304. For example, the seals 350 can have a cross-sectional shape generally matching or otherwise conforming to the shape of the corresponding notched portions 354 of the elements 330. In the illustrated embodiment, the individual seals 350 have a generally rectilinear or rectangular cross-sectional shape. In other embodiments, however, the seals 350 can have other suitable shapes. In addition, in certain embodiments the seals 350 can be made from a foam material, such as a closed-cell foam material. In other embodiments, however, the seals 350 can be made from other suitable materials including, for example, styrene, PVC, ABS, EPDM foam, neoprene, other open or closed cell foams, rubber, ethylene vinyl acetate (EVA), plastics, etc.

Figure 4:
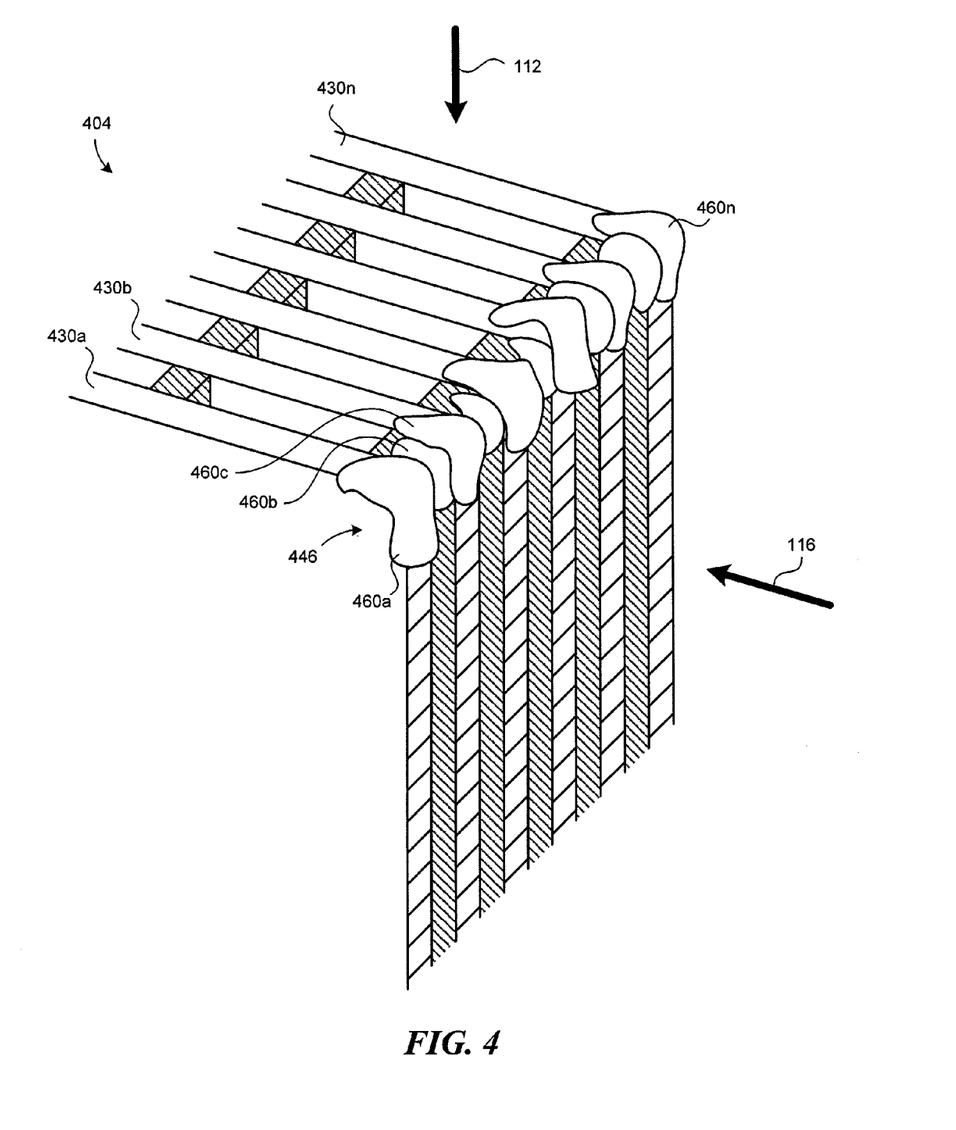
FIG. 4 is a partially schematic isometric side view of a portion of a heat exchange block configured in accordance with another embodiment of the disclosed technology.

FIG. 4 is a partially schematic isometric side view of a portion of the heat exchange block 404 configured in accordance with another embodiment of the disclosed technology. The illustrated heat exchange block 404 is generally similar in structure and function to the heat exchange block 304 described above with reference to FIGS. 3A and 3B, except that in the embodiment shown in FIG. 4 the heat exchange block 404 includes multiple individual seals or airflow blockers 460 (identified as first through n$^{th}$ seals 460a-460n) positioned along a corner edge portion 446 of individual elements 430. In certain embodiments, the seals 460 can include an adhesive, such as a hot melt adhesive, that is applied individually to the corner edge portion 446 of each individual element 430. In other embodiments, the seals 460 can be made from other suitable materials including, for example, foam, rubber, EVA, plastics, etc. As such, the elements 430 in the embodiment illustrated in FIG. 4 do not include a notched or cut-out portion, such as the notched portions 352 that received the corresponding seals 360 in FIGS. 3A and 3B.

The embodiments of the heat exchange blocks and corresponding seals described above for blocking the corresponding edge corner portions provide several advantages. For example, heat exchange blocks including seals or airflow blockers configured in accordance with embodiments of the present technology have been found to increase a dehumidifier's performance by approximately 5-10%, which can translate to approximately 7-10 additional pints of moisture removed from the environment per day.

Various embodiments and aspects of the heat exchange blocks are further illustrated and/or described in the Figures attached to this technology, which is incorporated herein in its entirety by reference. Although several dimensions are shown in the Figures, the dimensions are merely illustrative of one embodiment of the disclosed technology and, accordingly, the present technology is not limited to any of the values or features shown in the Figures.

From the foregoing, it will be appreciated that specific embodiments have been described herein for purposes of illustration, but that various modifications may be made without deviating from the spirit and scope of the disclosed technology. For example, a dehumidifier as described herein can be configured to include a seal or airflow blocker at discrete portions or sections of a corresponding heat exchange block. Furthermore, although features of the heat exchange blocks and related seals or airflow directors are described above with reference to dehumidifiers, in other embodiments the features and improvements relating to heat exchange blocks described herein can be applied to heat exchange blocks used in suitable applications other than dehumidifiers. Moreover, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the present technology.

We claim:

1. A dehumidifier comprising:
   at least one moisture removing component;
   a heat exchange block that directs an airflow through the moisture removing component, the heat exchange block including
      a plurality of spaced-apart elements having multiple airflow channels;
      a plurality of spacers positioned between neighboring elements and extending in a first direction, to space the corresponding elements apart from each other by a gap;
      a first airflow path extending in the first direction through the gaps between corresponding elements;
      a second airflow path extending through the airflow channels in a second direction, the heat exchange block having a first major surface generally parallel to the first direction and a second major surface generally parallel to the second direction;
      wherein the first and second major surfaces include a notch having a first notch surface generally parallel to the first major surface and a second notch surface generally parallel to the second major surface; and
      wherein the heat exchange block further includes
      an airflow blocker sealingly positioned in the notch to at least partially block air from passing between the first and second airflow paths in the heat exchange block, wherein the airflow blocker is in contact with the first and second notch surfaces.

2. The dehumidifier of claim 1 wherein the first direction is generally perpendicular to the second direction.

3. The dehumidifier of claim 1 wherein the spacers include:
   an interior spacer at least partially defining the first airflow path; and
   a peripheral spacer at least partially sealing the first airflow path between the corresponding elements.

4. The dehumidifier of claim 1 wherein individual elements include:
   a first side;
   a second side opposite to the first side; and
   a plurality of internal walls extending between the first side and the second side, wherein the internal walls at least partially define a generally corrugated configuration of the airflow channels.

5. The dehumidifier of claim 1 wherein individual elements include:
   a first side;
   a second side opposite to the first side; and
   a plurality of internal walls extending between the first side and the second side, wherein the internal walls at least partially define a generally fluted configuration of the airflow channels.

6. The dehumidifier of claim 1 wherein individual elements have a longitudinal dimension and a lateral dimension, and wherein the longitudinal dimension is generally parallel to the first direction, and wherein the lateral dimension is generally parallel to the second direction.

7. The dehumidifier of claim 1 wherein the moisture removing component includes an evaporator positioned between the first and second airflow paths, and wherein the first airflow path is coupled to the second airflow path external to the heat exchange block.

8. The dehumidifier of claim 1 wherein the airflow blocker includes a plurality of individual seals.

9. A heat exchange system, comprising:
   a plurality of elements, having a plurality of airflow channels;
   a plurality of peripheral spacers positioned toward edges of neighboring elements and extending in a first direction;
   a first airflow path extending in the first direction, wherein the first airflow path is at least partially defined by the corresponding elements and the peripheral spacers;
   a first major surface generally parallel to the first direction;
   a second airflow path defined by the airflow channels and extending in a second direction;
   a second major surface generally parallel to the second direction;
   wherein the first and second major surfaces include a notch having a first notch surface generally parallel to the first major surface and a second notch surface generally parallel to the second major surface; and wherein the system further comprises
   an airflow blocker sealingly positioned in the notch to restrict or prevent fluid communication between the first and the second airflow paths at the elements, wherein the airflow blocker is in contact with the first and second notch surfaces.

10. The system of claim 9, further comprising:
    a dehumidifier including an evaporator positioned between the first and second airflow paths; and
    a plurality of interior spacers positioned between neighboring elements and extending in the first direction, wherein the interior spacers at least partially define the first airflow path.

11. The system of claim 9 wherein the first direction is generally perpendicular to the second direction, and wherein individual elements have a longitudinal dimension and a lateral dimension, and wherein the longitudinal dimension is generally parallel to the first direction, and wherein the lateral dimension is generally parallel to the second direction.

12. The system of claim 9 wherein individual elements include:
a plurality of internal walls positioned inside individual elements and at least partially defining the airflow channels.

13. The system of claim 9 wherein the airflow blocker includes a plurality of individual seals.

14. A method of making a dehumidifier, comprising:
positioning a plurality of peripheral spacers, extending in a first direction, toward edges of neighboring elements, the elements having a plurality of airflow channels, the elements collectively forming a heat exchange block, the heat exchange block including a notch having a first notch surface and a second notch surface, the first direction being generally parallel to a first major surface of the heat exchange block, the second direction being generally parallel to a second major surface of the heat exchange block, the first notch surface being generally parallel to the first major surface, the second notch surface being generally parallel to the second major surface;
forming a first airflow path in the first direction, wherein the first airflow path is at least partially defined by the corresponding elements and the peripheral spacers;
forming a second airflow path extending in a second direction, wherein the second airflow path is at least partially defined by the airflow channels;
sealingly positioning an airflow blocker at the notch of the heat exchange block to prevent fluid communication between the first and the second airflow paths at the elements, wherein the airflow blocker is in contact with the first and second notch surfaces; and
positioning a moisture removing component between the first and second airflow paths.

15. The method of claim 14 wherein the first direction is generally perpendicular to the second direction, and wherein individual elements have a longitudinal dimension and a lateral dimension, and wherein the longitudinal dimension is generally parallel to the first direction, and wherein the lateral dimension is generally parallel to the second direction.

16. The method of claim 14, further comprising forming a plurality of internal walls inside individual elements, wherein the internal walls at least partially define the airflow channels.

17. The method of claim 14, further comprising positioning a plurality of interior spacers between neighboring elements, wherein the interior spacers at least partially define the first airflow path.

18. The method of claim 14, further comprising forming a notched portion at the corner portion of the elements, wherein the airflow blocker has a shape corresponding to a shape of the notched portion.

19. The method of claim 14 wherein positioning the airflow blocker further includes forming a plurality of individual seals.

* * * * *